March 28, 1967  J. M. VALDESPINO  3,311,239
AEROBIC WASTE TREATMENT SYSTEM
Filed July 22, 1966  3 Sheets-Sheet 3
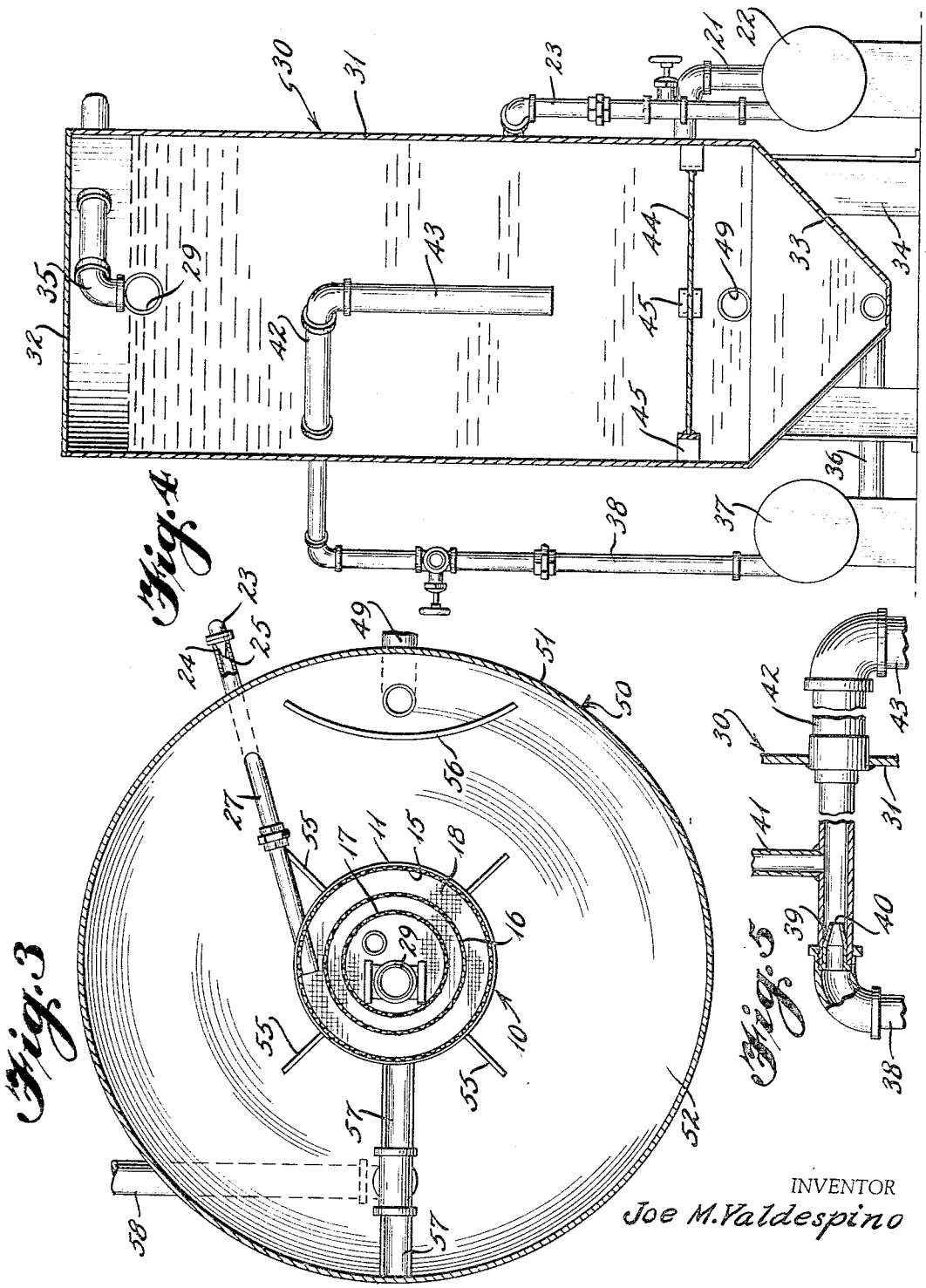
INVENTOR
Joe M. Valdespino
BY
ATTORNEYS United States Patent Office 3,311,239
Patented Mar. 28, 1967

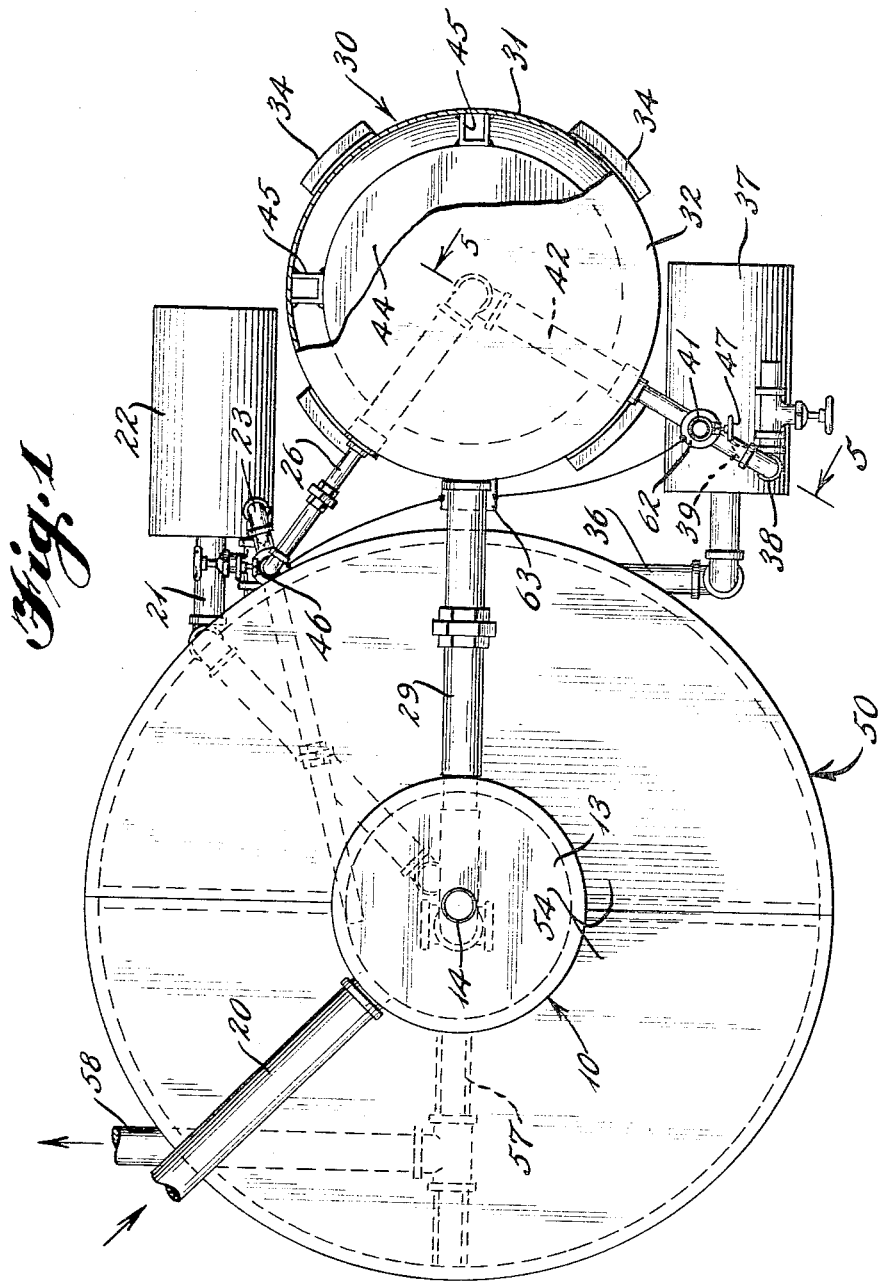

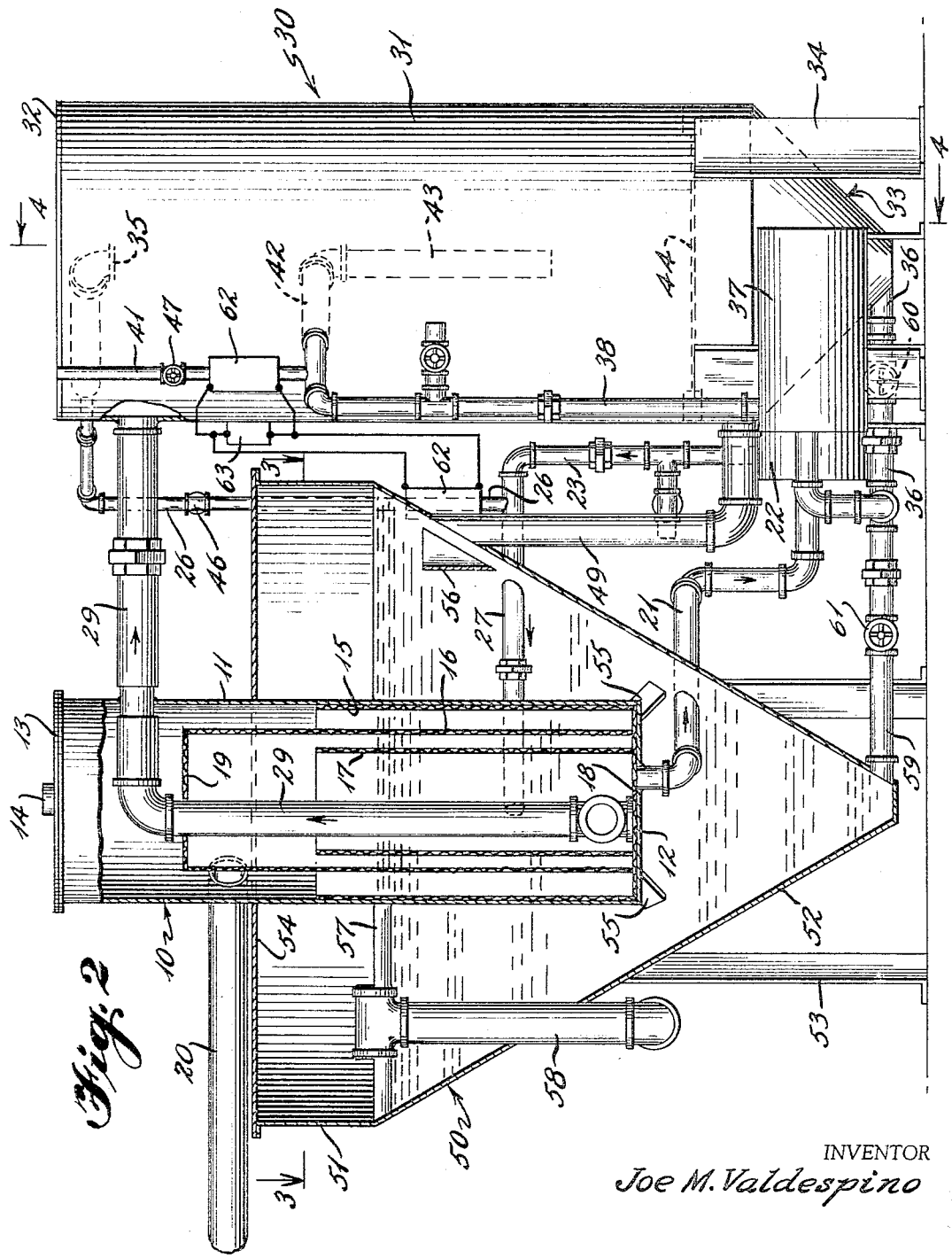

3,311,239
AEROBIC WASTE TREATMENT SYSTEM
Joe M. Valdespino, 5023 Golf Club Parkway,
Orlando, Fla. 32808
Filed July 22, 1966, Ser. No. 567,183
11 Claims. (Cl. 210—195)

This invention relates to the aerobic treatment of waste material and particularly to a relatively small compact unit which can be readily installed in an area of limited capacity, marine, land, or air.

Heretofore much work has been done on both aerobic and anaerobic treatment of waste matter on a relatively large scale such as municipalities but chemical treatment has been employed when the amount treated has been on a small scale, and whereas this has proved satisfactory to a certain extent for individual use, it has not proved feasible where it became desirable to increase capacity without material increase in physical size.

Normally ocean-going vessels either of military or commercial types have been able to discharge waste matter overboard when they have been at sea with no deleterious effects, but when these vessels have been in port such waste matter has created a pollution problem within the confined waters of the port area. Several federal agencies, including the United States Coast Guard and the United States Maritime Commission, have been seeking an answer to the problem of pollution of the ports and certain port authorities have ruled that waste matter cannot be discharged within the port area and, therefore, it has been necessary to store or retain the waste matter until the ships again were at sea. Often it has been necessary that larger ships remain in port for extended periods for various reason including while discharging and loading cargo, and the waste disposal problem has become acute. Also certain vessels such as those used primarily on inland waterways seldom reach the open sea and, therefore, facilities have had to be provided for storing the waste matter until it could be removed from such ships and treated.

It is an object of the invention to provide a relatively small compact aerobic waste treatment plant or unit which can be installed in a ship or other limited area and which can be operated intermittently or continuously to treat waste matter so that such matter can be processed without polluting the waters of a harbor, inland waterway, or the like area.

Another object of the invention is to provide a compact waste treatment unit which includes a disintegration tank, for comminuting waste solids, an aerated evacuation tank for aerobically treating the waste matter, and a settling tank from which relatively clear effluent liquid is discharged either for disposal or for re-use as a flushing liquid in a constantly operating cycle.

A further object of the invention is to provide a simple compact waste treatment unit for aerobically treating waste matter in which parts inclined to wear can be easily replaced in a minimum of time and with minimum effort.

Other objects and advantages of the invention will be apparent from the following description taken in conjunction with the accompanying drawings in which:

FIG. 1 is a top plan view of the waste treatment plant or unit of the present invention;

FIG. 2, a side elevation thereof with portions broken away for clarity;

FIG. 3, a horizontal section on the line 3—3 of FIG. 2;

FIG. 4, a vertical section on the line 4—4 of FIG. 2; and,

FIG. 5, an enlarged fragmentary vertical section on the line 5—5 of FIG. 1.

With continued reference to the drawings, the present invention includes a relatively small disintegrator tank 10 having a generally cylindrical housing 11 closed at one end by a bottom wall 12 and having a cover 13 removably mounted on the opposite end in any desired manner. The cover 13 may have a vent 14 to prevent the formation of a pressure head in the tank 10 and to maintain the pressure therein at atmospheric. The tank 10 is provided with outer, intermediate, and inner generally concentric rings or bands 15, 16 and 17, respectively, constructed of a perforated roughened material such as expanded metal or the like. The rings rest on an expanded metal base 18 and the intermediate ring 16 may have a cover 19 of the same material. Raw sewage or other waste matter is introduced into the tank 10 through an influent line 20 which discharges the sewage into the area between the outer ring 15 and the intermediate ring 16.

The liquid and solid waste matter within the tank 10 are adapted to be rotated rapidly causing the solids to engage the roughened surfaces of the rings 15, 16 and 17 to cause disintegration or comminution of the same into relatively fine particles and liquid. In order to cause movement of the matter within the tank 10, an outlet pipe 21 is provided having one end extending through the bottom wall 12 and the opposite end connected to the inlet of a circulation pump 22. Liquid and small particles are discharged from the pump 22 under pressure through a return line 23. Such return line is provided with a venturi type aspirator 24 having a reduced neck portion 25 through which the liquid and small particles must pass. As the liquid passes through the neck portion 25, the pressure on the liquid is reduced while the velocity is increased in direct proportion thereto.

On the downstream side of the neck portion 25, air is introduced through an air line 26 due to the suction or negative pressure created by the liquid passing through the neck portion. The introduction of air promotes the pressure and velocity of the liquid through a discharge line 27. Liquid from the line 27 is discharged between the outer ring 15 and the intermediate ring 16 to cause a relatively violent, tumbling, swirling, circulating action of the material within the tank 10. This action causes disintegration and comminution of the solids by contact with the rings 15, 16 and 17. Also, the air being introduced by the aspirator will cause oxidation of the solids and particles and prevent the formation of toxic odors as well as accelerate the aerobic process.

After the solids have been comminuted, the liquid and small particles are adapted to be discharged by gravity upwardly through a discharge line 29 into an evacuated column aeration tank 30. Such tank includes a generally cylindrical body 31 closed at the upper end by a top or cover 32 welded or otherwise attached in airtight relation to the body 31. The lower portion of the body is closed by a tapered frusto-conical sump 33 to form an airtight chamber. The tank 30 can be supported in any desired manner, as by legs 34.

The liquid level within the tank 30 is maintained near the top of the tank and substantially above the liquid level of the tank 10. In order to do this, the air line 26 extends into the tank 30 adjacent the top 32 and has a downwardly directed inlet 35 on the end thereof. When the aspirator 24 creates a suction, it draws air from the interior of the tank 30 and evacuates the air therein to cause a partial vacuum within such tank. As the air is evacuated, the liquid level will rise until it reaches the inlet 35. Obviously the air within the tank 30 must be replenished so that the aspirator 24 will continue to function. Also it is desirable to aerate the liquid within the tank 30 to oxidize and treat its contents aerobically. This is done by providing an outlet line 36 connected at one end to the sump 33 and the opposite end of such line is connected to the inlet of a pump 37. Liquid and small particles removed through the line 36 will be discharged under pressure from the pump 37 through a return line 38.

A venturi type aspirator 39 is disposed within the line 38 and such aspirator is provided with a reduced neck portion 40 through which the liquid and solid matter must pass. As the material passes through the neck portion 40 the pressure is reduced and the velocity is accelerated in direct proportion to each other. On the downstream side of the aspirator, an air line 41 is provided open to the atmosphere so that a suction or negative pressure created within the line 38 by the aspirator 39 will introduce air under atmospheric pressure into the liquid flow. The introduction of air will promote the pressure and velocity of the liquid through a line 42 inside of the tank 30. The line 42 is provided with a downwardly extending portion 43 which will direct the liquid and solid matter which has had air entrained therein in a downward direction where it will impinge upon a target plate or baffle 44. The target plate or baffle is of a diameter less than the inner diameter of the body 31 and is mounted in spaced relation thereto by a plurality of mounting brackets 45 so that liquid and solid matter can pass around the target plate or baffle into the sump 33.

The air entrained in the line 38 by the aspirator 39 will move upwardly through the liquid within the tank to aerate and oxidize the contents and accelerate the aerobic treatment of the same. When the air reaches the surface, such air will feed the air line 26 so that the aerator 24 will continue to function properly. After the water level within the tank 30 has risen to the bottom of the inlet 35 the amount of air being introduced into the tank will be substantially the same as the amount of air being exhausted through the air line 26. The amount of air is controlled by an air valve 46 in the line 26 and an air valve 47 in the air line 41 (FIG. 2).

A discharge line 49 is connected to the tank 30 adjacent to the frusto-conical sump 33 and below the target plate 44 so that liquid can flow from the tank 30 into a settling tank 50. The settling tank includes an upper generally cylindrical portion 51 and a lower frusto-conical portion 52, and such tank may be supported in any desired manner, as by legs 53. The top of the tank 50 is adapted to be closed and substantially sealed in any desired manner as by a split cover 54. In practice it has been found that the disintegrator tank 10 can be contained within the settling tank 50 and supported therein by brackets 55.

The discharge line 49 removes substantially clear liquid from the tank 30 with some small portion of relatively fine particles suspended therein, and such liquid is discharged into the settling tank behind a baffle 56 to a relatively calm area which permits the particles to settle to the bottom of the frusto-conical portion 52. Clear liquid at the liquid level of the settling tank 50 will be discharged over a weir 57 which may be constructed in any desired manner, as by the lower halves of a pair of pipes connected to an effluent line 58 for discharging relatively clear liquid from the apparatus. The liquid being discharged through the effluent line can be discharged from the system or can be directed by a pump (not shown) or other means, to a holding tank to provide flushing water, or the system could be continuously operated using the same water.

The liquid level within the tank 30 will remain substantially constant regardless of the amount of incoming liquid as long as the air being removed through the air line 26 is substantially the same as the air being introduced through the air line 41. When liquid is introduced through the influent line 20 an equal amount will be discharged by gravity through the discharge line 29 into the tank 30. The incoming liquid will tend to cause the liquid level within the tank 30 to rise until it is above the inlet 35 at which time the air being exhausted will be shut off to temporarily interrupt the suction. Air moving upwardly through the liquid within the tank 30 will begin to build a pressure head at the top of the tank and force the liquid downwardly and out of the tank through the discharge line 49 into the settling tank 50 until the water level within the tank 30 drops to a point below the inlet 35 at which time the suction on the air line 26 will be re-established.

Periodically the particles that have settled to the bottom of the tank 50 must be removed and this is done by providing a line 59 connected at one end to the base portion of the frusto-conical portion 52 and the opposite end of such line is connected to the discharge line 36 which is connected to the inlet of the pump 37. The lines 36 and 59 may be provided with gate valves 60 and 61, respectively, so that the flow of material can be controlled from either the tank 30 or the tank 50 to the pump 37.

It is contemplated that each of the air lines 26 and 41 may have an ozonizer unit 62 located along the flow of air if desired. The ozonizer units are connected to one or more high voltage, low amperage transformers 63 mounted in any convenient location, such as the wall of the tank 30. The ozonizer units may be of conventional construction in which the transformer 63 causes an arcing or corona effect which produces ozone ($O_3$). The ozone is a very unstable gas and will attack any other gases, such as hydrogen sulfide resulting from the decomposition of the waste matter and will cause a chemical change to convert the noxious gases to innocuous gases.

In the operation of the sewage treatment system liquid and waste matter may be introduced into the tank 10 either intermittently or continuously. When the system is started the disintegrator tank 10 and the settling tank 50 will be filled with water or other liquid until the water level reaches the top of the weir 57 and since the pressure in both tanks is atmospheric the liquid will be substantially the same. The aeration tank 30 will be subjected to a negative pressure or partial vacuum and, therefore, the water level in this tank will be substantially higher than the water level of the disintegrator tank and the settling tank. When liquid and solids are introduced through the influent line 20 into the disintegrator tank, the pump 22 will be operated to withdraw liquid and particulate matter from the disintegrator tank, and such liquid and matter will be forced back into the tank through the return line 23, the aspirator 24 and the line 27 under increased pressure and velocity. The action of the liquid being introduced through the line 27 will cause a swirling, tumbling, circulating motion of the solids within the tank and will cause such solids to engage the roughened surfaces of the rings 15, 16 and 17 which will cause disintegration or comminution of such solids into relatively fine particulate matter. The aspirator 24 also will cause air to be entrained within the liquid to oxidize the solids and particulate matter to accelerate the aerobic process.

When the solids and liquid are introduced into the disintegrator tank, a corresponding volume of liquid and particulate matter will be discharged from the tank through the discharge line 29 into the aeration tank 30 where the particulate matter will be aerobically treated. The tank 30 will be under a partial vacuum caused by the air line 26 and the aspirator 24 removing the air from the upper portion of the tank 30 and introducing such air into the line 27. The liquid and particulate matter within the tank 30 are subjected to air for sustaining the aerobic process while being subjected to further disintegration and tumbling caused by removing the liquid and particulate matter from the bottom of the tank and pumping the same through an aspirator which causes air under atmospheric pressure to be introduced and entrained within the stream which is then discharged against a target plate 44 within the tank 30.

When a predetermined volume of material has been introduced into the tank 30 a corresponding volume of relatively clear liquid will be discharged therefrom through the discharge line 49 into the settling tank 50. The liquid within the settling tank is maintained relatively calm and motionless to permit any particulate matter to settle to the bottom thereof where it can be periodically removed by the pump 37. A weir 57 is disposed within the settling tank 50 and such weir is connected to an effluent line 58 so that when a predetermined volume of material is introduced into the settling tank 50 a corresponding volume of clear liquid will be discharged through the effluent line. The entire system is balanced automatically so that when a predetermined volume of raw material is introduced into the system an equal volume of treated material will be discharged.

It will be apparent that a relatively simple aerobic waste treatment system has been provided which is compact and which can be located in a relatively small space and operated substantially continuously while material being introduced and discharged can be either intermittent or continuous.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. An aerobic waste treatment system for use with facilities having limited capacity comprising a disintegrator tank having a generally cylindrical wall structure, a series of roughened perforated concentric rings located within said disintegrator tank, an influent line for introducing waste matter into said disintegrator tank between certain of said rings, a pump connected to said disintegrator tank and adapted to remove material from said tank and to return the material to said tank under pressure through a first return line, a first venturi type aspirator located in said first return line, a first air line connected to said first return line adjacent to the downstream side of said aspirator, means for discharging liquid and particulate matter from said disintegrator tank, an aeration tank receiving the liquid and particulate matter from said disintegrator tank, said aeration tank including a generally cylindrical body having a top and a bottom providing an airtight chamber, said first air line extending into said aeration tank adjacent to the top thereof, a second pump for removing liquid and particulate matter from said aeration tank and for returning the liquid and particulate matter to said aeration tank under pressure through a second return line, a second venturi type aspirator located within said second return line, a second air line connected at one end to said second return line adjacent to the downstream side of said second aspirator, the opposite end of said second air line being open to the atmosphere, said first air line adapted to create a partial vacuum within said aeration tank, a settling tank, means connecting said settling tank and said aeration tank for discharging relatively clear liquid from said aeration tank into said settling tank, means for returning particulate material which has settled to the bottom of said settling tank to said aeration tank, and means for removing clear liquid from said settling tank, whereby waste material which is introduced into said disintegrator tank will be comminuted, then treated aerobically and thereafter relatively clear liquid will be discharged from the unit.

2. An aerobic waste treatment system comprising a first tank, means for introducing waste matter including liquids and solids into said tank, means in said first tank for comminuting said waste solids into relatively small particles, means for circulating the matter within said first tank, a first venturi type aspirator located in said circulating means, said aspirator having an air line for introducing air into said first tank, a second tank for receiving liquid and small particles from said first tank, means connecting said first tank and said second tank and providing communication therebetween, means for circulating the liquid and particles in said second tank, a second venturi type aspirator in said second tank circulating means, said second venturi type aspirator including an air line for introducing air into said second tank, whereby waste material will be comminuted in said first tank and aerobically treated in said second tank.

3. The structure of claim 2 including means providing a partial vacuum within said second tank.

4. The structure of claim 3 in which said first air line extends into said second tank adjacent to the top thereof for creating a partial vacuum within said second tank.

5. The structure of claim 2 including a third tank connected to said second tank and adapted to receive liquid therefrom, and means for discharging relatively clear liquid from said third tank.

6. The structure of claim 5 including overflow weir means located in said third tank and over which relatively clear liquid is discharged.

7. The structure of claim 5 in which said first tank is disposed generally concentrically of said third tank and means is provided for supporting said first tank within said third tank.

8. The structure of claim 5 including means for returning particles from said third tank to said second tank.

9. The structure of claim 2 in which said first tank includes at least one roughened perforated ring arranged generally concentrically of said first tank and adapted to comminute any solids therein to particulate matter.

10. The structure of claim 2 in which said second tank includes a target plate against which the circulated liquid and particles are discharged.

11. The structure of claim 2 in which said first and second air lines each include a valve to control the flow of air therethrough.

No references cited.

REUBEN FRIEDMAN, *Primary Examiner.*

J. DE CESARE, *Assistant Examiner.*